(12) United States Patent
Chino et al.

(10) Patent No.: US 8,954,333 B2
(45) Date of Patent: Feb. 10, 2015

(54) APPARATUS, METHOD, AND COMPUTER PROGRAM PRODUCT FOR PROCESSING INPUT SPEECH

(75) Inventors: Tetsuro Chino, Kanagawa (JP); Satoshi Kamatani, Kanagawa (JP); Kentaro Furihata, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1638 days.

(21) Appl. No.: 12/037,724

(22) Filed: Feb. 26, 2008

(65) Prior Publication Data

US 2008/0208597 A1    Aug. 28, 2008

(30) Foreign Application Priority Data

Feb. 27, 2007    (JP) .................................. 2007-046925

(51) Int. Cl.
*G10L 15/18*    (2013.01)
(52) U.S. Cl.
CPC ................................. *G10L 15/1822* (2013.01)
USPC .......................................... 704/275; 704/270
(58) Field of Classification Search
CPC . G06F 17/28; G06F 17/2854; G06F 17/2863; G10L 15/00; G10L 15/04; G10L 15/05; G10L 15/22
USPC .................................................... 704/2–5, 7
See application file for complete search history.

(56) References Cited

U.S. PATENT DOCUMENTS

| | | | |
|---|---|---|---|
| 5,855,000 A * | 12/1998 | Waibel et al. | 704/235 |
| 6,278,968 B1 * | 8/2001 | Franz et al. | 704/3 |
| 6,763,331 B2 * | 7/2004 | Wakita et al. | 704/251 |
| 6,952,665 B1 * | 10/2005 | Shimomura et al. | 704/2 |
| 2002/0120436 A1 * | 8/2002 | Mizutani et al. | 704/2 |

(Continued)

FOREIGN PATENT DOCUMENTS

| | | |
|---|---|---|
| JP | 10-40267 | 2/1998 |
| JP | 11-7447 | 1/1999 |

(Continued)

OTHER PUBLICATIONS

Furihata et al.; "Apparatus Performing Translation Process From Inputted Speech"; U.S. Appl. No. 11/896,567, filed Sep. 4, 2007.

(Continued)

*Primary Examiner* — Jialong He
(74) *Attorney, Agent, or Firm* — Finnegan, Henderson, Farabow, Garrett & Dunner, L.L.P.

(57) ABSTRACT

An analyzing unit performs a morphological analysis of an input character string that is obtained by processing input speech. A generating unit divides the input character string in units of division previously decided, that is composed of one or plural morphemes, and generates partial character strings including part of components of the divided input character string. A candidate output unit outputs the generated partial character strings to a display unit. A selection receiving unit receives a partial character string selected from the outputted partial character strings as a target to be processed.

14 Claims, 10 Drawing Sheets

(56) References Cited

U.S. PATENT DOCUMENTS

| | | | |
|---|---|---|---|
| 2003/0216912 A1* | 11/2003 | Chino | 704/231 |
| 2004/0243392 A1* | 12/2004 | Chino et al. | 704/7 |
| 2005/0131673 A1* | 6/2005 | Koizumi et al. | 704/2 |
| 2005/0283365 A1* | 12/2005 | Mizutani et al. | 704/257 |
| 2006/0217964 A1* | 9/2006 | Kamatani et al. | 704/7 |
| 2006/0271350 A1 | 11/2006 | Chino et al. | |
| 2006/0293876 A1* | 12/2006 | Kamatani et al. | 704/2 |
| 2006/0293889 A1* | 12/2006 | Kiss et al. | 704/235 |
| 2007/0043567 A1* | 2/2007 | Gao et al. | 704/257 |
| 2007/0073540 A1 | 3/2007 | Hirakawa et al. | |
| 2007/0118351 A1* | 5/2007 | Sumita | 704/2 |
| 2007/0203688 A1* | 8/2007 | Fuji et al. | 704/2 |
| 2008/0133245 A1* | 6/2008 | Proulx et al. | 704/277 |

FOREIGN PATENT DOCUMENTS

| | | |
|---|---|---|
| JP | 2000-242645 | 9/2000 |
| JP | 2001-13992 | 1/2001 |
| JP | 2001-155467 | 6/2001 |
| JP | 2003-281183 | 10/2003 |
| JP | 2005-173731 | 6/2005 |

OTHER PUBLICATIONS

Chino et al.; "Method, Apparatus, and Computer Program Product for Machine Translation", U.S. Appl. No. 11/812,837, filed Jun. 22, 2007.

Notice of Rejection issued by the Japanese Patent Office on Mar. 1, 2011, for Japanese Patent Application No. 2007-046925, and partial English-language translation thereof.

Mukaigaito et al., "Conversation-Coupled Navigation System Providing Relevant Information by Responding Telephone Conversation," NTT Technical Journal (Mar. 1, 2006), 18:61-64.

Hori et al., "Summarized Speech Sentence Generation Based on Word Extraction and Its Evaluation," Institute of Electronics, Information and Communication Engineers (Feb. 1, 2002), J85-D-II:200-209.

Hori et al., "Integration of speech recognition, sentence refinement, and summarization using finite-state transducers," Lecture collection of the 2003 Spring Research Meeting of the Acoustical Society of Japan (Mar. 18, 2003), pp. 65-66.

* cited by examiner

FIG.5

| JAPANESE SPEECH INPUT V | 成田からボストンまでのビジネスクラスのチケットを2枚下さい |

FIG.6

| RECOGNITION RESULT J | 成田からボストンまで地熱くらしのチケットを2枚下さい |
| --- | --- |
| SCORE S | 72 |

FIG.7

| MORPHEME SEQUENCE | 成田 | から | ボストン | まで | 地熱 | くらし | の | チケット | を | 2 | 枚 | 下さい |
|---|---|---|---|---|---|---|---|---|---|---|---|---|
| CATEGORY | NOUN | PARTICLE | NOUN | PARTICLE | NOUN | NOUN | PARTICLE | NOUN | PARTICLE | DIGIT | POSTFIX | VERB |

| SEGMENT Q | 成田から/ボストンまで/地熱くらしの/チケットを/2枚/下さい |

FIG.9

| OUTPUT A | 成田からボストンまで地熱くらしのチケットを2枚下さい |
| OUTPUT B | ボストンまで地熱くらしのチケットを2枚下さい |
| OUTPUT C | 成田から地熱くらしのチケットを2枚下さい |
| OUTPUT D | 成田からボストンまでチケットを2枚下さい |
| OUTPUT E | 成田からボストンまで地熱くらしの2枚下さい |
| OUTPUT F | 成田からボストンまで地熱くらしのチケットを下さい |
| OUTPUT G | 成田からボストンまで地熱くらしのチケットを2枚 |

FIG.10

| SELECTED CANDIDATE | 成田からボストンまでチケットを2枚下さい |

FIG.11

| TRANSLATION RESULT | Please give me two tickets from Narita to Boston. |

| TRANSLATION RESULT | Please give me two tickets of geothermal file from Narita to Boston. |

FIG.15

| SEGMENT Q | Please / give me / two tickets / of geothermal file / from Narita /to Boston. |

FIG.16

| OUTPUT A | Please give me two tickets of geothermal file from Narita to Boston. |
| OUTPUT B | give me two tickets of geothermal file from Narita to Boston. |
| OUTPUT C | Please two tickets of geothermal file from Narita to Boston. |
| OUTPUT D | Please give me of geothermal file from Narita to Boston. |
| OUTPUT E | Please give me two tickets from Narita to Boston. |
| OUTPUT F | Please give me two tickets of geothermal file to Boston. |
| OUTPUT G | Please give me two tickets of geothermal file from Narita. |

FIG.17

| SELECTED CANDIDATE | Please give me two tickets from Narita to Boston. |

FIG.18

APPARATUS, METHOD, AND COMPUTER PROGRAM PRODUCT FOR PROCESSING INPUT SPEECH

CROSS-REFERENCE TO RELATED APPLICATIONS

This application is based upon and claims the benefit of priority from the prior Japanese Patent Application No. 2007-046925, filed on Feb. 27, 2007; the entire contents of which are incorporated herein by reference.

BACKGROUND OF THE INVENTION

1. Field of the Invention

The present invention relates to an apparatus, a method, and a computer program product for performing a speech recognizing process and the like for input speech and outputting a result of the process.

2. Description of the Related Art

Recently, human interfaces using speech input have been progressively put to practical use. For example, speech operating systems have been developed that allow the user to vocally input a specific command that is previously set, recognize the command, and automatically execute the corresponding operation, thereby enabling the use of the system with speech. Systems that realize creation of sentences using speech input by analyzing arbitrary sentences vocalized by the user to convert the sentences into character strings have been also developed. Spoken dialogue systems that enable interaction between the user and the system using a spoken language and the like have been developed and already been utilized.

In speech recognizing processes used by the respective systems, contents of the speech produced by the user means are usually recognized by the following method. A produced speech signal is captured into a system by a microphone or the like, converted into an electrical signal, and sampled in units of a very short period of time using an analog-to-digital (A/D) converter or the like, to obtain digital data in a time sequence of waveform amplitude, for example. The digital data is subjected to a technique such as a fast Fourier transform (FFT) analysis to obtain for example changes in frequency according to time, thereby extracting feature data of the produced speech signal. Standard patterns of phonemes, for example, that are prepared as a dictionary associated with recognition results and a sequence thereof, and the feature data extracted by the process above mentioned are compared and matched using a hidden Markov model (HMM) method, a dynamic programming (DP) method, or a neutral network (NN) method, to generate recognition candidates of the contents of the produced speech. To enhance the recognition accuracy, a statistical language model as typified by N-gram is utilized for the generated recognition candidates to estimate and select the most probable candidate, thereby recognizing the contents of the produced speech.

In the speech recognition, performing the recognition 100 percent without error is quite difficult due to the following factors, and is considered next to impossible. Segmentation of speech into sections may not be properly made due to noises and the like in an environment where the speech inputting is performed. The waveform of the input speech can be transformed due to factors that vary between individuals such as speech quality, volume, speaking rate, speaking style, and dialect, and checking of the recognition results may not be accurately performed.

There are also cases that the recognition cannot be performed because the user speaks an unknown language that is not prepared in the system, that a word is erroneously recognized as an acoustically similar word, and that a word is erroneously recognized as a wrong word due to an imperfect standard pattern or statistical language mode that is prepared.

When the process is continued after the erroneous recognition, an erroneous operation is usually induced. Therefore, operations for elimination of influences of the erroneous operation, restoration, re-input of the same speech, and the like are required, which imposes burdens on the user. Even when the speech is input again, there is no guarantee that the erroneous recognition is always overcome.

Meanwhile, when the recognition result is corrected before continuation of the process to avoid such a problem, keyboard manipulation and the like are usually required. Accordingly, hands-free characteristics of the speech inputting are lost and the operational burdens on the user are increased.

The system mentioned above outputs the most probable candidate as a correct recognition result. Accordingly, even when the speech recognition ends in an erroneous recognition, the system itself has no way of knowing which part of the recognition is wrong and which part is correct. Therefore, to correct the erroneous recognition part, the user must determine the erroneous recognition part and then correct it.

In connection with such a problem, JP-A 2000-242645 (KOKAI) proposes a technology of generating not only one most probable speech recognition candidate but also plural speech recognition candidates having close recognition scores, translating the generated candidates, and presenting summaries of translation histories together with the plural translation results. This allows a conversational partner to recognize the reliability of the process result and easily assume the contents of speech of the speaker, and provides sufficient and smooth communication even when the performance of the recognition process is low.

However, in the method described in JP-A 2000-242645 (KOKAI), even when a recognition candidate to be selected is included in the proposed plural recognition candidates, the process cannot be continued when this recognition candidate includes an erroneous recognition part, and correction or re-input is required. Therefore, like in the typical technologies, the hands-free characteristics of speech inputting can be lost, or the burden on the user due to the correcting process can be increased.

SUMMARY OF THE INVENTION

According to one aspect of the present invention, a speech processing apparatus includes a speech receiving unit that receives input speech; a speech processing unit that obtains a text character string from the input speech; an analyzing unit that performs a morphological analysis of the text character string; a generating unit that divides the text character string into components in units of division that are previously decided and composed of at least one of the morphemes, and generates partial character string candidates including part of the components; a first output unit that outputs the partial character string candidates to a display unit; and a selection receiving unit that receives a partial character string selected from the partial character string candidates.

According to another aspect of the present invention, a speech processing method includes receiving an input speech; obtaining a text character string from the input speech; performing a morphological analysis of the text character string; dividing the text character string into components in units of division that are previously decided and composed of at least one of the morphemes, and generating partial character string candidates including part of the components; outputting the partial character string candidates to a display unit; and receiving a partial character string selected from the partial character string candidates.

A computer program product according to still another aspect of the present invention causes a computer to perform the method according to the present invention.

DETAILED DESCRIPTION OF THE INVENTION

Exemplary embodiments of an apparatus, a method, and a computer program product for performing speech processing according to the present invention will be explained below in detail with reference to the accompanying drawings.

A speech processing apparatus according to a first embodiment of the present invention generates plural partial character strings (hereinafter, "partial representations"), each of which is obtained by removing a partial character string from a speech recognition result, presents to the user the generated partial representations, receives a partial representation that is selected from the presented partial representations by the user as a target for speech processing, and performs the speech processing.

Explanations are given below of an exemplary case that the speech processing apparatus according to the first embodiment is implemented as a speech translating apparatus that translates speech input by the user in a source language into a target language semantically equivalent, and outputs the translated speech, thereby supporting cross-language communication. In this example, Japanese and English are used for the source language and the target language, respectively, while the source language and the target language are not limited to this combination, and the first embodiment can be applied to combinations of any languages.

Figure 1:
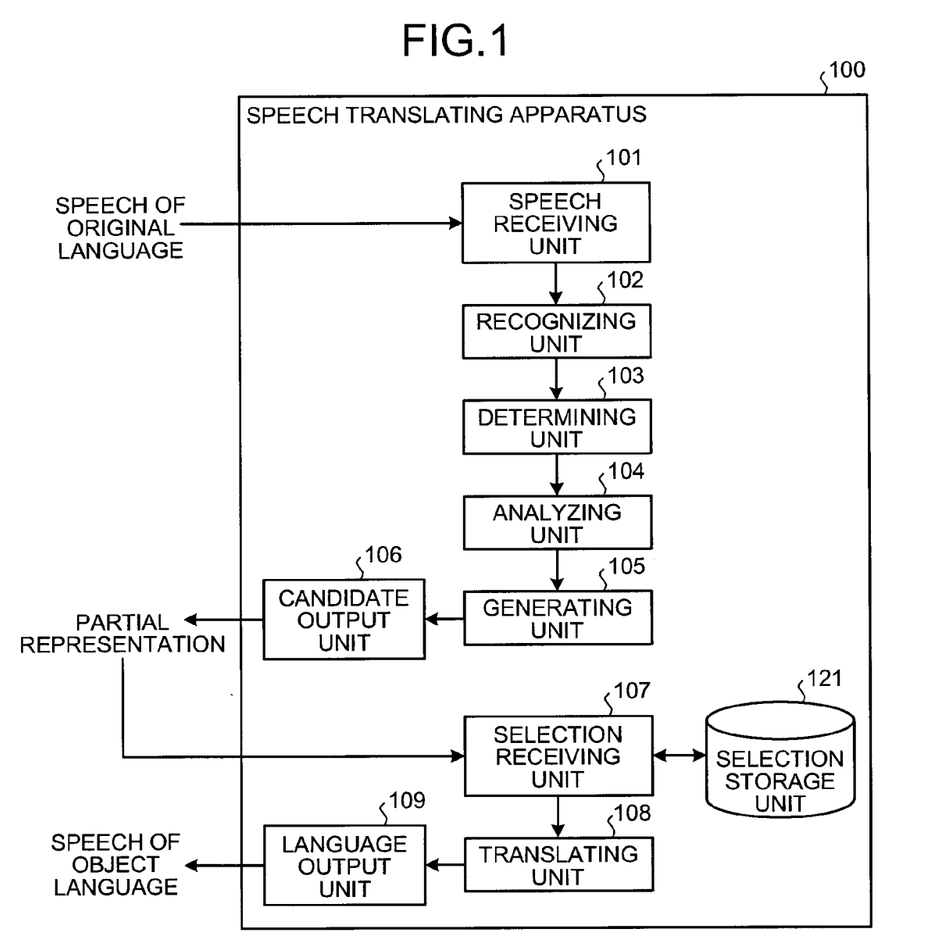
FIG. 1 is a block diagram of a configuration of a speech translating apparatus according to a first embodiment of the present invention.

As shown in FIG. 1, a speech translating apparatus 100 has a speech receiving unit 101, a recognizing unit 102, a determining unit 103, an analyzing unit 104, a generating unit 105, a candidate output unit 106, a selection receiving unit 107, a translating unit 108, a language output unit 109, and a selection storage unit 121.

The speech receiving unit 101 samples an analog signal of speech inputted through a microphone (not shown) or the like in units of a very short period of time, converts the signal into a stereo digital signal in a time sequence of waveform amplitude, for example, and outputs the digital signal. The A/D converting technique that is typically used or the like can be used in the process performed by the speech receiving unit 101.

The recognizing unit 102 receives the digital speech signal outputted from the speech receiving unit 101, and performs a speech recognizing process of generating candidates for recognition result as the corresponding character string of the Japanese text, and likelihood representing the probability of the recognition (hereinafter, "recognition score"). In the speech recognizing process, any speech recognizing method using a Linear Predictive Coding (LPC) analysis, the Hidden Markov Model (HMM), the dynamic programming, the neutral network, the N-gram language model or the like, that is commonly utilized, can be employed.

For example, the recognizing unit 102 applies a technology such as the fast Fourier transformation (FFT) analysis to analyze changes in frequency according to time, and extracts feature data of the produced speech signal. The recognizing unit 102 then compares and matches standard patterns of phonemes, which are prepared as a dictionary associated with the recognition results or the sequence thereof, and the extracted feature data using the HMM method, the dynamic programming method, or the neutral network method, and generates recognition candidates for the contents of the produced speech.

To enhance the recognition accuracy, the recognizing unit 102 estimates and selects the most probable candidate from the generated recognition candidates using for example a statistical language model typified by the N-gram, to recognize the contents of the produced speech.

The determining unit 103 performs various determining processes required for the speech translating process. Specifically, the determining unit 103 determines whether the recognition score of the speech recognition result is smaller than a predetermined threshold value. Only when the recognition score is smaller than the threshold value, generation of partial representations is performed.

The determining unit 103 determines whether a partial representation corresponding to the inputted character string (hereinafter, "input character string") is stored in the selection storage unit 121. When the partial representation is stored, the process is continued using the partial representation obtained from the selection storage unit 121. Because, in the first embodiment, the partial representation is generated for the speech recognition result, the speech recognition result is the input character string.

The analyzing unit 104 extracts morphemes from the input character string. The analyzing unit 104 analyzes the morphemes in the input character string using a morpheme analyzing technique that is typically employed, and extracts the morphemes. When the process result of the speech recognizing process by the recognizing unit 102 is obtained in the form of morpheme sequence, the speech recognition result can be used directly as a morphological analysis result, without additionally performing the morpheme analyzing process by the analyzing unit 104.

The generating unit 105 divides the input character string into plural syntactic or semantic sections using the morphological analysis result, and selects an arbitrary number of sections from the plural divided sections, thereby generating plural partial representations corresponding to the source language representation (input character string).

For example, when the speech in Japanese is inputted, the generating unit 105 identifies segments by a method of recognizing every appearance of a predetermined self-sufficient word class as the head of a segment, in a word class sequence that is obtained by the morphological analysis for the recognition result of the inputted speech, thereby to divide the recognition result into segments. The generating unit 105 considers character strings that are obtained by removing the divided segments from the head of the character string one by one, as candidates for partial representation corresponding to the source language representation.

The method of dividing the recognition result is not limited thereto. The input character string can be divided into syntactic or semantic dividing units by any method using the typical natural language processing such as chunking, segment extraction, phrase structure extraction, syntax analysis, dependency analysis (dependent structure analysis), and named entity (proper representation extraction) analysis. The generating unit 105 can divide the input character string in units of division as semantic blocks that are obtained by using a character or expression peculiarly appearing in a time or number representation as a clue. The semantic dividing units are not limited thereto, and can be any semantic units such as the degree, greetings, and formulaic expressions.

The candidate output unit 106 selectably presents to the user listing of the candidates for partial representation generated by the generating unit 105 on a display unit such as an image display (not shown).

The selection receiving unit 107 receives a partial representation selected by the user from the candidates for partial representation presented by the candidate output unit 106. The selection receiving unit 107 outputs the received selection of the partial representation as a target for a translating process, to the translating unit 108.

The selection receiving unit 107 is implemented by receiving a partial representation that is inputted through an operation input unit (not shown) such as a touch sensor, and a button or a dial that is made correspond to a screen display with a mark or an arrangement.

The translating unit 108 performs a translating process of converting the character string of the Japanese text to be translated, received by the selection receiving unit 107, into a semantically equivalent English text. Any machine translation technologies that are commonly used and classified broadly into a rule-based method and an example-based method can be used in the translating process by the translating unit 108.

According to the rule-based machine translation, an arbitrary character string in Japanese is automatically translated into a semantically equivalent character string in English based on previously defined rules such as grammars and dictionaries in Japanese and English, and semantic correspondences between vocabularies in Japanese and English. The rule-based translation information including a rule-based translation result and a rule-based translation score representing the certainty of the translation is outputted.

According to the example-based machine translation, previously provided parallel translations that are pairs of semantically equivalent examples of Japanese and English are stored in a storage unit, and an English text corresponding to an inputted Japanese text is appropriately retrieved based on the similarity of the inputted text to the example with reference to the stored parallel translations, thereby generating a translation result of the inputted sentence in Japanese. In the example-based translation process, the correspondence between words in Japanese and English and the like are properly referred to and utilized.

The translating technologies that can be applied are not limited to those above mentioned. A statistical translation that obtains a parallel translation of an source language input according to statistical information based on a large amount of example data can be utilized.

The language output unit 109 outputs the translation result from the translating unit 108 on a display unit such as an image display. The language output unit 109 can perform text speech synthesis of converting text information of the translation result into speech, and output the synthesized speech to a speaker (not shown) or the like. In this case, any speech synthesizing technology that is commonly used, such as Text-to-Speech, can be used in the speech synthesizing process.

The selection storage unit 121 stores a combination of the selected partial representation received by the selection receiving unit 107 and the input character string that is a source used by the generating unit 105 to generate the partial representation. The selection storage unit 121 is referred to when the determining unit 103 determines whether a partial representation corresponding to the input character string is stored.

Figure 2:
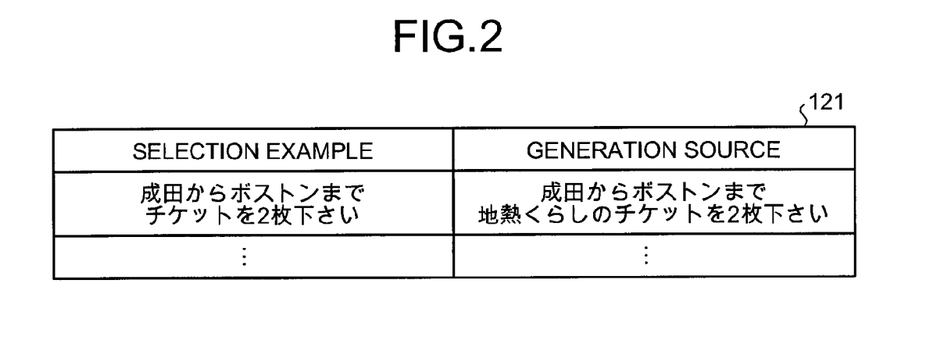
FIG. 2 is a schematic diagram for explaining an example of a data configuration of information stored in a selection storage unit.

As shown in FIG. 2, a selection example showing a received selection of a partial representation and a generation source showing an input character string that is a source used to generate the selection example are stored in the selection storage unit 121, being related to each other.

The selection storage unit 121 can be configured by any storage medium commonly used, such as a hard disk drive (HDD), an optical disk, a memory card, and a random access memory (RAM).

Figure 3:
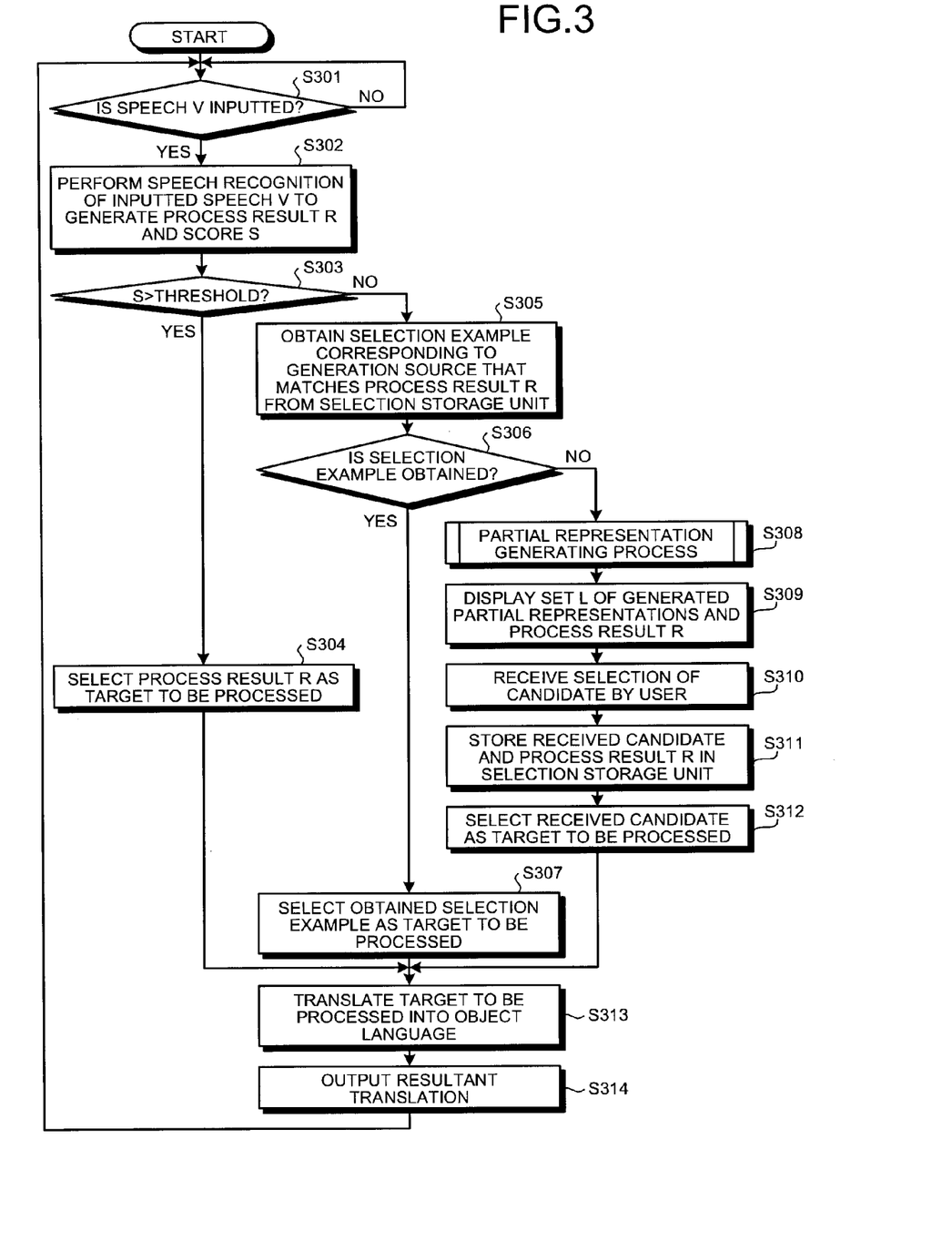
FIG. 3 is a flowchart of an entire speech translating process according to the first embodiment.

The speech translating process performed by the speech translating apparatus 100 according to the first embodiment is explained with reference to FIG. 3.

The speech receiving unit 101 determines whether speech (hereinafter, V) is inputted (step S301). When the speech V is not inputted (NO at step S301), the process is repeated until the speech V is inputted.

When the speech V is inputted (YES at step S301), the recognizing unit 102 performs speech recognition of the inputted speech V, to generate a result (hereinafter, R) of the speech recognizing process and a recognition score (hereinafter, S) (step S302).

The determining unit 103 determines whether the recognition score S is larger than a predetermined threshold value (step S303). When the recognition score S is larger (YES at step S303), the generating unit 105 selects the process result R as a target to be processed (step S304). When the recognition score S is larger, the reliability of the speech recognition result is high. Therefore, it is considered that communications are not interfered even when the recognition result itself is outputted without partial representations being generated. In the first embodiment, the target to be processed is a target for the translating process by the translating unit 108.

When the recognition score S is not larger than the predetermined threshold value (NO at step S303), the determining unit 103 retrieves a generation source matching the process result R from the selection storage unit 121, and obtains a selection example corresponding to the retrieved generation source from the selection storage unit 121 (step S305). The determining unit 103 determines whether it obtained the selection example (step S306). When the determining unit 103 obtained the selection example (YES at step S306), the generating unit 105 selects the obtained selection example as the target to be processed (step S307).

In the process of retrieving the selection example at step S305, not only a generation source completely matching the process result R is retrieved, but a generation source partially matching the process result R can be retrieved. In this case, a selection example in which a different part is replaced is obtained.

When the selection example is not obtained (NO at step S306), a partial representation generating process of generating a partial representation for the process result R is performed (step S308). Details of the partial representation generating process are described later.

The candidate output unit 106 selectably outputs candidates for the target to be processed, including a set (hereinafter, L) of partial representations generated in the partial representation generating process and the process result R that is the generation source of the set L of the partial representations, to the display unit (step S309).

The selection receiving unit 107 receives a candidate selected by the user from the candidates for the target to be processed that are displayed on the display unit (step S310). The selection receiving unit 107 stores the received candidate and the process result R being related to each other, in the selection storage unit 121 (step S311). This allows the apparatus to learn the selection of the partial representation by the user and to use the selection in a later speech translating process. The selection receiving unit 107 selects the received candidate as the target to be processed (step S312). The number of candidates to be selected is not limited to one. Plural candidates can be selected for the target to be processed.

When the generating unit 105 selects the process result R for the target to be processed at step S304, when the generating unit 105 selects the selection example obtained from the selection storage unit 121 for the target to be processed at step S307, or when the selection receiving unit 107 selects the received candidate for the target to be processed in step S312, the translating unit 108 translates the selected target to be processed into a translation target language (step S313). As described above, the translating unit 108 translates the character string in an source language as the target to be processed, in a character string in an target language according to the rule-based or example-based machine translation.

The language output unit 109 outputs a resultant translation by the translating unit 108 to the display unit (step S314), and terminates the speech translating process. The language output unit 109 can output speech obtained by performing speech synthesis of the character string in the target language that is the resultant translation, to a loudspeaker or the like.

The details of the partial representation generating process at step S308 are explained with reference to FIG. 4.

The analyzing unit 104 performs a morphological analysis of the process result R to generate a morpheme sequence (hereinafter, P) (step S401). The generating unit 105 extracts segments (hereinafter, Q) from the generated morpheme sequence P according to a segmentation rule (step S402).

A specific example of the segmentation rule and details of the segmenting process are explained. In the segmenting process, morphemes in the process result R are classified into predetermined groups, and segments that are obtained by connecting morphemes in the adjacent groups according to the segmentation rule are extracted, thereby dividing the process result R into segments.

The segmentation rule (hereinafter, C) are defined as follows, for example:
<Segmentation Rule C>
C1: Word classes appearing in a morpheme sequence are classified into the following groups G1 to G4.
(G1) Classify content words solely forming a semasiological unit into this group. In Japanese, the verb and the like are classified into this group.
(G2) Classify content words solely or continuously appearing and forming a semasiological unit into this group. In Japanese, the noun, the adjective, the digit, and the like are classified into this group.
(G3) Classify functional words connecting to the front of another content word into this group. In Japanese, the prefix and the like are classified into this group.
(G4) Classify functional words connecting to the back of another content word into this group. In Japanese, the particle, the postfix, and the like are classified into this group.
C2: A morpheme having the word class in the category G3 not at the end of the sentence is coupled to the next appearing morpheme.
C3: A morpheme having the word class in the category G4 not at the beginning of the sentence is coupled to the preceding morpheme.
C4: When morphemes having the word class in the category G2 are adjacent, these morphemes are coupled.

The segmentation rule and the segmenting process are not limited to those mentioned above. Any method typically used such as the chunking, the phrase structure extraction, the syntax analysis, the dependency analysis, and the named entity analysis can be used.

The generating unit 105 initializes a counter (hereinafter, I) for counting a processed segment to 1 (step S403). The generating unit 105 generates a character string from the process result R by removing an Ith segment from the segments Q, and adds the generated character string to the set L of the partial representations (step S404).

The generating unit 105 increments the counter I by one (step S405), and determines whether the counter I exceeds the number of segments (step S406). When the counter I does not exceed the number of segments (NO at step S406), the generating unit 105 repeats the process by generating a partial representation by removing the next segment and adding the generated partial representation to the set L of the partial representations (step S404).

When the counter I exceeds the number of segments (YES at step S406), the generating unit 105 outputs the set L of the partial representations (step S407), and terminates the partial representation generating process.

In the first embodiment, plural partial representations are generated by removing segments in the process result R one by one, and outputted. A partial representation can be generated by removing plural segments. In this case, the plural candidates received by the selection receiving unit 107 can be merged to obtain a target to be processed.

Figure 5:
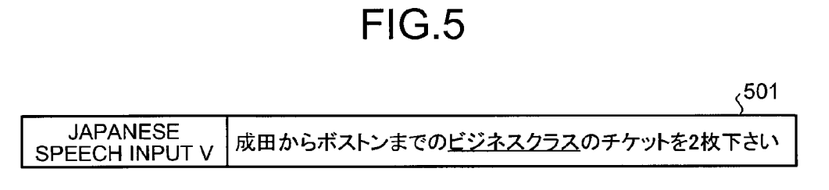
FIG. 5 is a schematic diagram for explaining an example of input speech in Japanese.

A specific example of the speech translating process performed by the speech translating apparatus 100 according to the first embodiment is explained. FIG. 5 is a schematic diagram for explaining an example of speech input (hereinafter, V) in Japanese as inputted speech.

FIG. 5 depicts a case that speech 501 meaning that "Please give me two Business-class tickets from Narita to Boston" is inputted as the Japanese speech input V (step S301).

Figure 6:
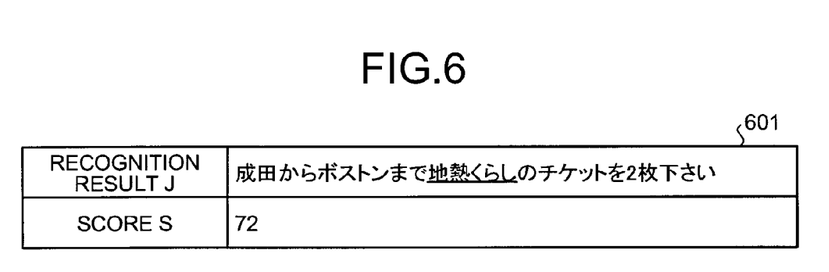
FIG. 6 is a schematic diagram for explaining an example of a recognition result for the Japanese speech input.

FIG. 6 is a schematic diagram for explaining an example of a recognition result (hereinafter, J) of the Japanese speech input V. FIG. 6 depicts a case that an erroneous recognition result 601 meaning that "Please give me two tickets of geothermal file from Narita to Boston" is generated as the recognition result J, being related to the recognition score S (step S302).

That is, this example shows that Japanese of an underlined part of the speech 501 in FIG. 5, meaning "Business class" is erroneously recognized as Japanese of an underlined part of the recognition result 601 in FIG. 6, meaning "geothermal file".

When the predetermined threshold value for the recognition score is set at "80", the determining unit 103 performs the process of obtaining a selection example from the selection storage unit 121 because the recognition score S is "72" in the case shown in FIG. 6 (NO at step S303, step S305).

Assuming that a selection example cannot be obtained from the selection storage unit 121 (NO at step S306), the partial representation generating process is performed (step S308). In the partial representation generating process, the morpheme analyzing process for the recognition result J is performed (step S401).

Figure 7:
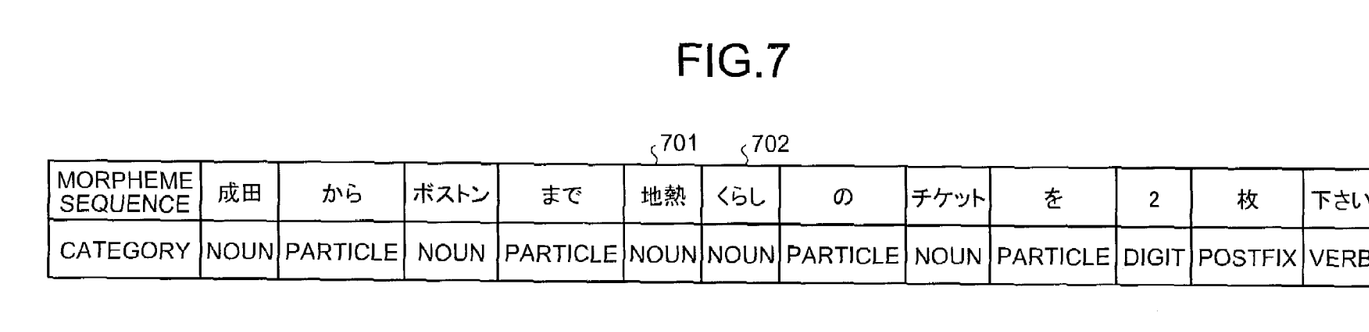
FIG. 7 is a schematic diagram for explaining an example of a morpheme sequence that is obtained by performing a morphological analysis of a recognition result.

FIG. 7 is a schematic diagram for explaining an example of a morpheme sequence P that is a resultant of the morphological analysis of the recognition result J shown in FIG. 6. FIG. 7 depicts a morpheme sequence P in the form of table containing analyzed morphemes and the word classes of the morphemes being related to each other.

The segmenting process of dividing the recognition result J into segments is performed with reference to the segmentation rule C and the morpheme sequence P (step S402). The word classes appearing in the morpheme sequence P are classified into groups according to the segmentation rule C1.

For example, four morphemes in Japanese having the word class of the particle and morphemes in Japanese having the word class of the postfix in the morpheme sequence shown in FIG. 7 are classified into the group G4.

Because two of the noun that is one of conjoining independent word classes are adjacent to each other, a noun 701 meaning "geothermal" and a noun 702 meaning "file" are coupled according to the segmentation rule C4.

According to the segmentation rule C3, each of morphemes having the word class in the category G4 not at the beginning of the sentence (the particle) is coupled to the preceding morpheme.

According to the segmentation rule C3, each of morphemes having the word class in the category G4 not at the beginning of the sentence (the postfix) is coupled to the preceding morpheme.

Figure 8:
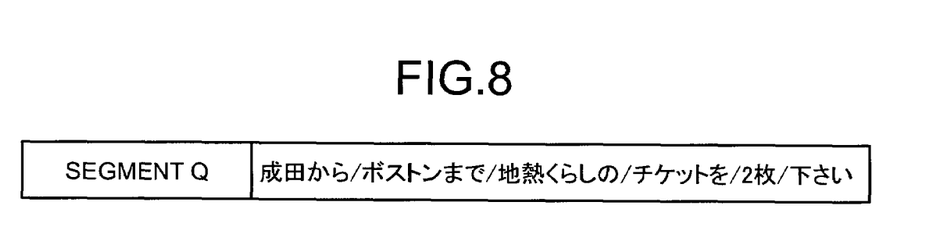
FIG. 8 is a schematic diagram for explaining an example of divided segments.

This process divides the recognition result J into segments. FIG. 8 is a schematic diagram for explaining an example of the segments Q divided by the segmenting process. In FIG. 8, a unit separated by marks "/" represents a segment.

Partial representations are successively generated by removing the respective divided segments one by one, and added to the set L of the partial representations (step S404).

Figure 9:
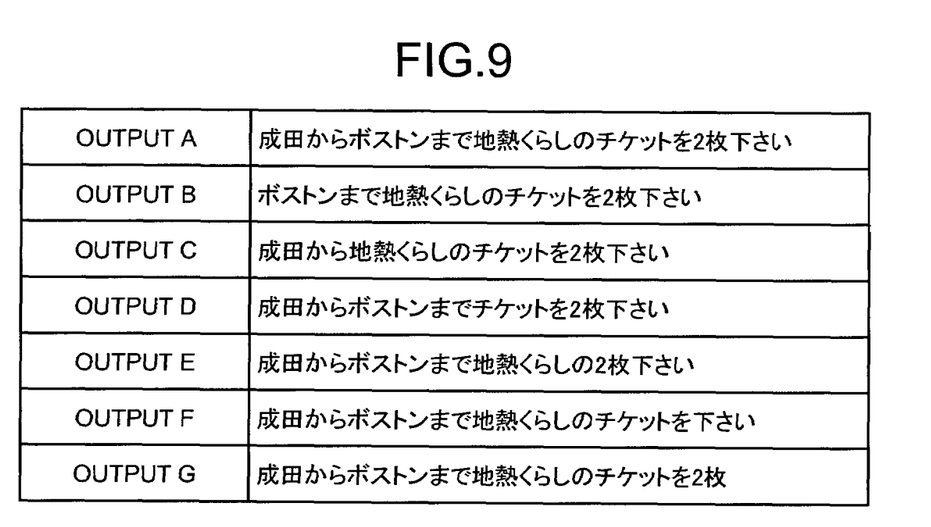
FIG. 9 is a schematic diagram for explaining an example of candidates for target to be processed.

FIG. 9 is a schematic diagram for explaining an example of candidates for the target to be processed, including the set L of the partial representations generated from the segments Q divided as shown in FIG. 8. As shown in FIG. 9, as the candidates for the target to be processed, the original recognition result J (output A) is also outputted together with the set L of the partial representations (step S309).

Figure 10:
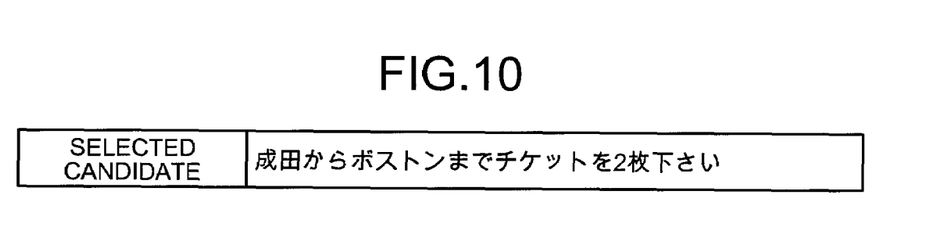
FIG. 10 is a schematic diagram for explaining an example of a selected candidate.

Assume that the user selects an output D in FIG. 9 from the outputted candidates (step S310). FIG. 10 depicts a case that the user selects the output D that is a partial representation having a segment including the underlined Japanese in the recognition result 601 in FIG. 6 removed.

In this case, the selection receiving unit 107 stores the output D and the recognition result J, being related to each other, in the selection storage unit 121 (step S311). In this way, the information as shown in FIG. 2 is stored in the selection storage unit 121.

Figure 11:
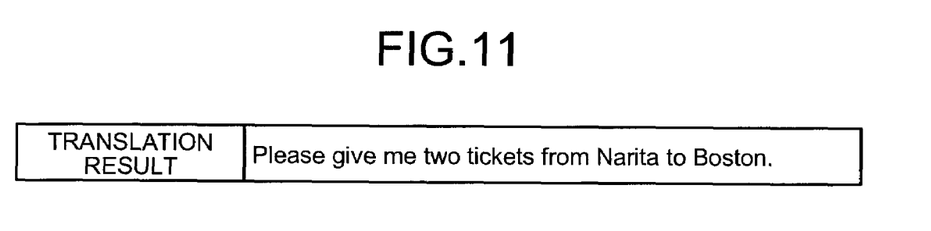
FIG. 11 is a schematic diagram for explaining an example of a translation result.

The selected candidate is selected for the target to be processed (step S312), and the selected target to be processed is translated into English as the target language (step S313). As shown in FIG. 11, even with the partial representation from which a part of the segments of the recognition result J is removed, a translation result that does not obscure the intention of the speaker can be outputted when a proper partial representation is selected.

According to the process above mentioned, even when a partial erroneous recognition of the user's speech input occurs, the user can continue the speech processing only by selecting a candidate that matches the user's intention from the presented candidates. Therefore, the need for a complicated correction operation is eliminated, and advantageous hands-free characteristics of the speech input can be fully utilized.

Generation of partial representations is performed only when the certainty of the recognition result is low. Therefore, an unnecessary partial representation generating process is avoided, resulting in a reduced burden of the speech processing and an increased processing speed.

The results of the previous selection of the partial representation can be stored in the selection storage unit 121. Accordingly, an appropriate partial representation for the same or similar recognition error can be obtained from the selection storage unit 121, and thus the user can continue the process without selecting a candidate.

Unlike the conventional technique of presenting plural candidates for the recognition result, plural partial representations newly generated from the recognition result can be presented for the target to be processed. Therefore, although the conventional technique needs a burdensome correction process when plural recognition results all include an erroneous recognition, a partial representation not including an erroneous recognition part can be generated in the first embodiment. Accordingly, the process can be continued without the correction process.

In the first embodiment, the case that the speech processing apparatus is implemented as the speech translating apparatus that translates a recognition result and outputs a resultant translation has been explained. The first embodiment can be applied to any apparatus that performs only a recognizing process without performing a translating process, such as a speech operating system and a spoken dialog system.

The recognizing process is not limited to speech recognition that recognizes inputted speech. The recognizing process can be applied to character string recognition that recognizes a character string inputted with a pen, recognition of gestures, and the like.

When the selection example can be obtained from the selection storage unit 121, the obtained selection example is selected for the target to be processed, while the obtained selection example can be presented in priority to other candidates. For example, the obtained selection example can be displayed next to the recognition result R. The priority depending on the frequency of selecting the selection example can be stored in the selection storage unit 121, and the selection example can be displayed according to priority.

When the generated partial representations are large in number, the partial representations to be displayed can be limited to a number that is previously decided. In this case, a predetermined number of partial representations corresponding to the recognition score of the recognition result can be displayed. Accordingly, when the recognition score is low for example, more partial representations can be displayed than in the case that the recognition score is high.

The speech processing apparatus according to the first embodiment generates plural partial representations by removing a part of a character string from a speech recognition result, presenting the generated partial representations to the user, and receiving a partial representation selected by the user from the presented partial representations, as a target for speech processing, to perform the processing. Thus, the process for the speech recognition result can be promptly continued without a burdensome correction operation.

In the first embodiment, partial representations are generated from a speech recognition result. A speech processing apparatus according to a second embodiment of the present invention generates partial representations from a translation result that is obtained by translating a recognition result, and presents the generated partial representations to the user.

Figure 12:
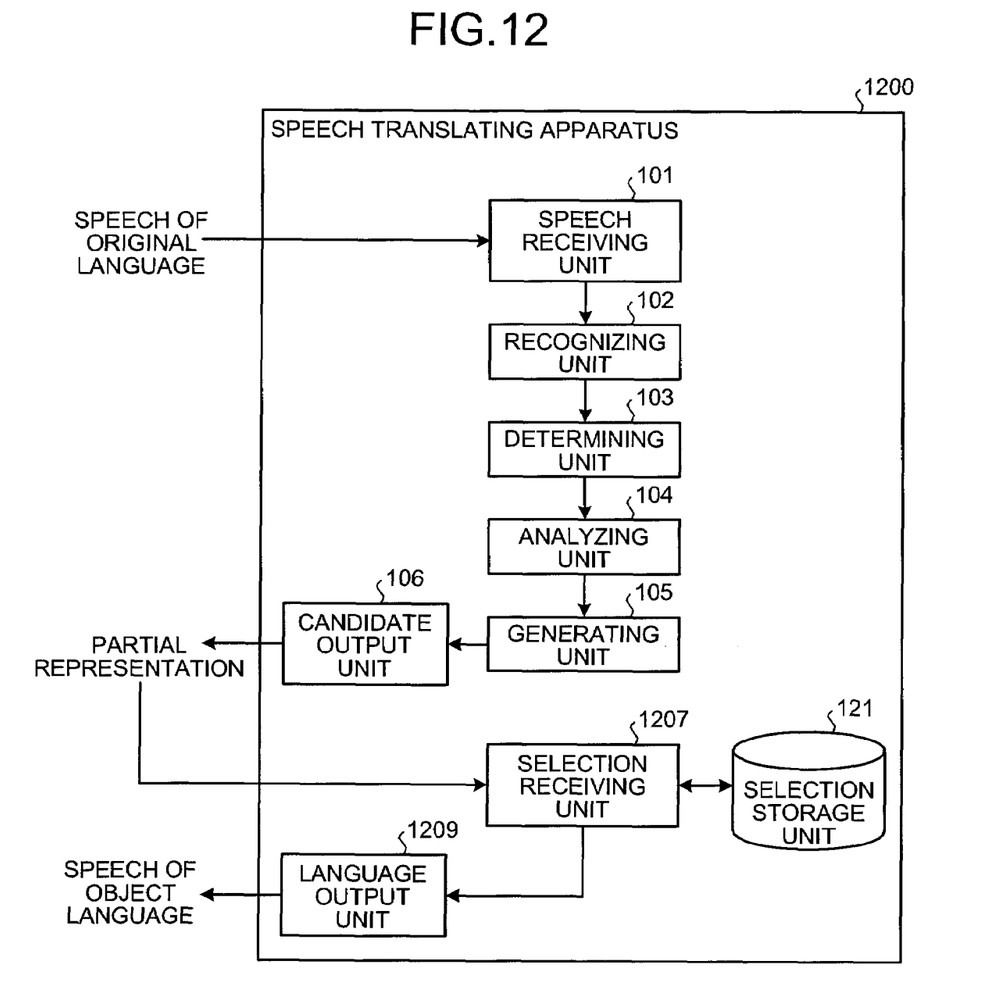
FIG. 12 is a block diagram of a configuration of a speech translating apparatus according to a second embodiment of the present invention.

As shown in FIG. 12, a speech translating apparatus 1200 includes the speech receiving unit 101, the recognizing unit 102, the determining unit 103, the analyzing unit 104, the generating unit 105, the candidate output unit 106, a selection receiving unit 1207, a translating unit 1208, a language output unit 1209, and the selection storage unit 121.

In the second embodiment, functions of the selection receiving unit 1207, the translating unit 1208, and the language output unit 1209 are different from those in the first embodiment. Other components and functions are the same as those shown in FIG. 1 that is a block diagram of a configuration of the speech translating apparatus 100 according to the first embodiment. Therefore, these components are denoted by like reference numerals and explanations thereof will be omitted.

The selection receiving unit 1207 is different from the selection receiving unit 107 according to the first embodiment, which receives a selected partial representation and selects the received partial representation as a target to be translated, in that the selection receiving unit 1207 receives a selected partial representation and selects the received partial representation as a target to be outputted to the user. In the second embodiment, the translating process is performed after the recognizing process, and partial representations are generated from the translation result.

The translating unit 1208 is different from the translating unit 108 according to the first embodiment in that the language output unit 1209 translates a text character string as a recognition result from the recognizing unit 102 into a target language.

The language output unit 1209 is different from the language output unit 109 according to the first embodiment, which outputs the translation result from the translating unit 108 to the display unit such as an image display, in that the language output unit 1209 outputs the translation result or a partial representation of the translation result received by the selection receiving unit 1207.

Figure 13:
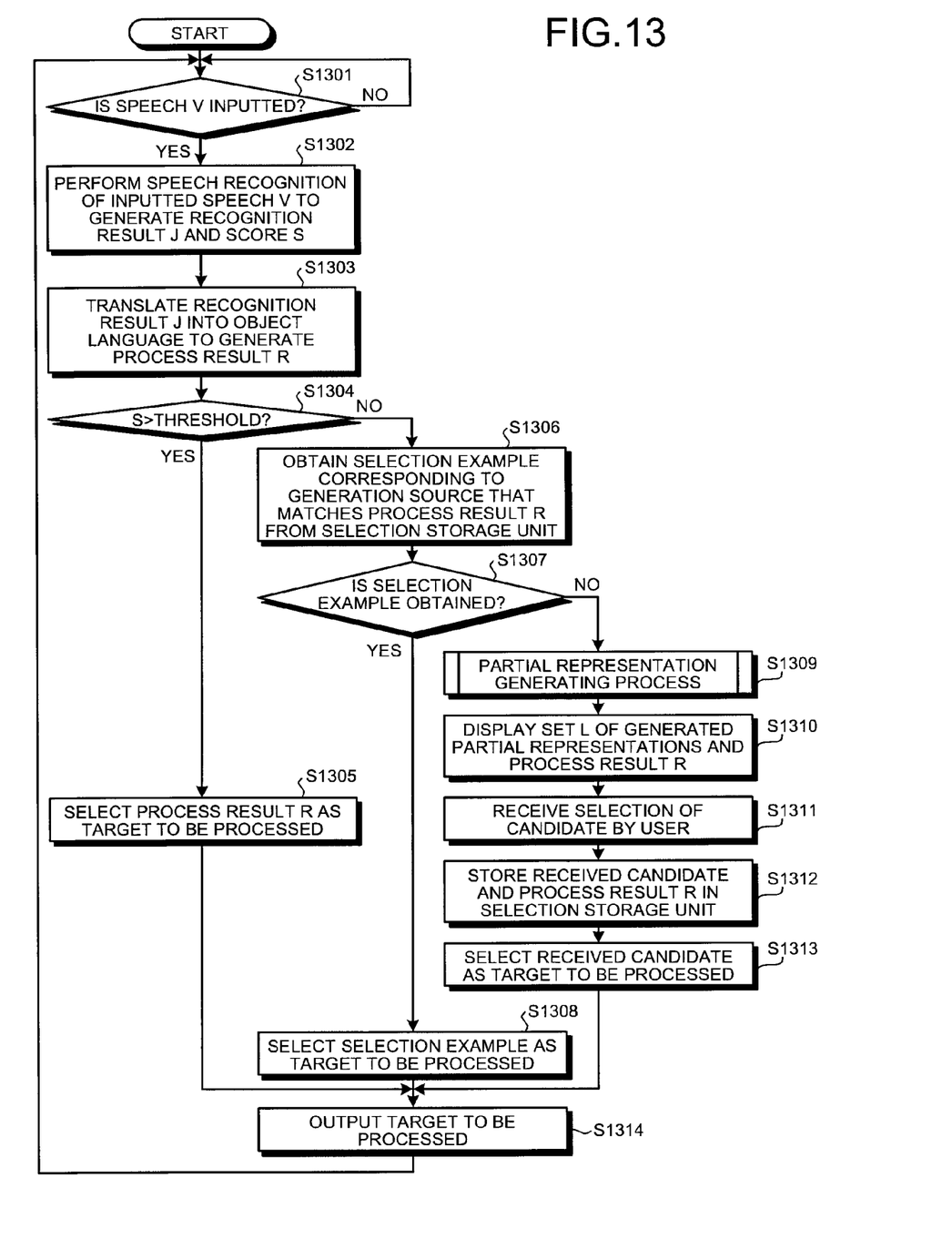
FIG. 13 is a flowchart of an entire speech translating process according to the second embodiment.

A speech translating process performed by the speech translating apparatus 1200 according to the second embodiment is explained with reference to FIG. 13.

The speech receiving unit 101 determines whether speech V is inputted (step S1301). When the speech V is not inputted (NO at step S1301), the process is repeated until the speech V is inputted.

When the speech V is inputted (YES at step S1301), the recognizing unit 103 performs speech recognition of the inputted speech V, to generate a recognition result (hereinafter, J) and a recognizing score S (step S1302).

The translating unit 1208 translates the recognition result J into a target language, to generate a process result R as a translation result (step S1303).

The score comparing process, the selection example obtaining process, the partial representation generating process, and the candidate receiving process from steps S1304 to S1313 are the same processes as those at steps S303 to S312 performed by the speech translating apparatus 100 according to the first embodiment. Therefore, explanations thereof will be omitted.

When the generating unit 105 selects the process result R as the target to be processed at step S1305, when the generating unit 105 selects a selection example obtained from the selection storage unit 121 as the target to be processed at step S1308, or when the selection receiving unit 1207 selects a received candidate as the target to be processed at step S1313, the language output unit 1209 outputs the selected target to be processed, to a display unit (step S1314), and terminates the speech translating process.

A specific example of the speech translating process performed by the speech translating apparatus 1200 according to the second embodiment is explained. Assume here that Japanese speech input V that is the same as that shown in FIG. 5 is inputted, and that the recognition result J as shown in FIG. 6 is obtained.

Figure 14:
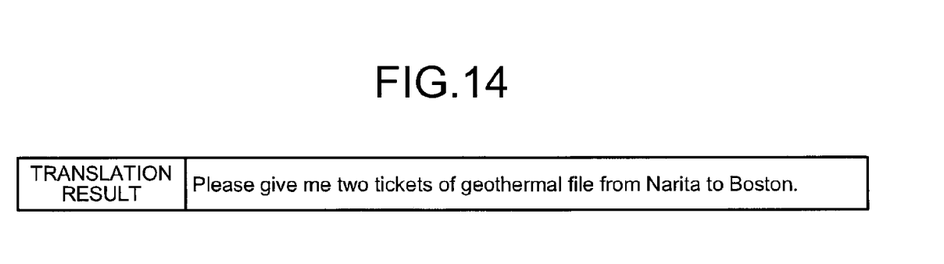
FIG. 14 is a schematic diagram for explaining an example of a translation result.

In the second embodiment, the partial representation generating process is performed not for the recognition result but for the translation result. Therefore, the recognition result J shown in FIG. 6 is translated, and the resultant translation is outputted (step S1303). FIG. 14 is a schematic diagram for explaining an example of the translation result that is obtained by translating the recognition result J shown in FIG. 6.

Figure 4:
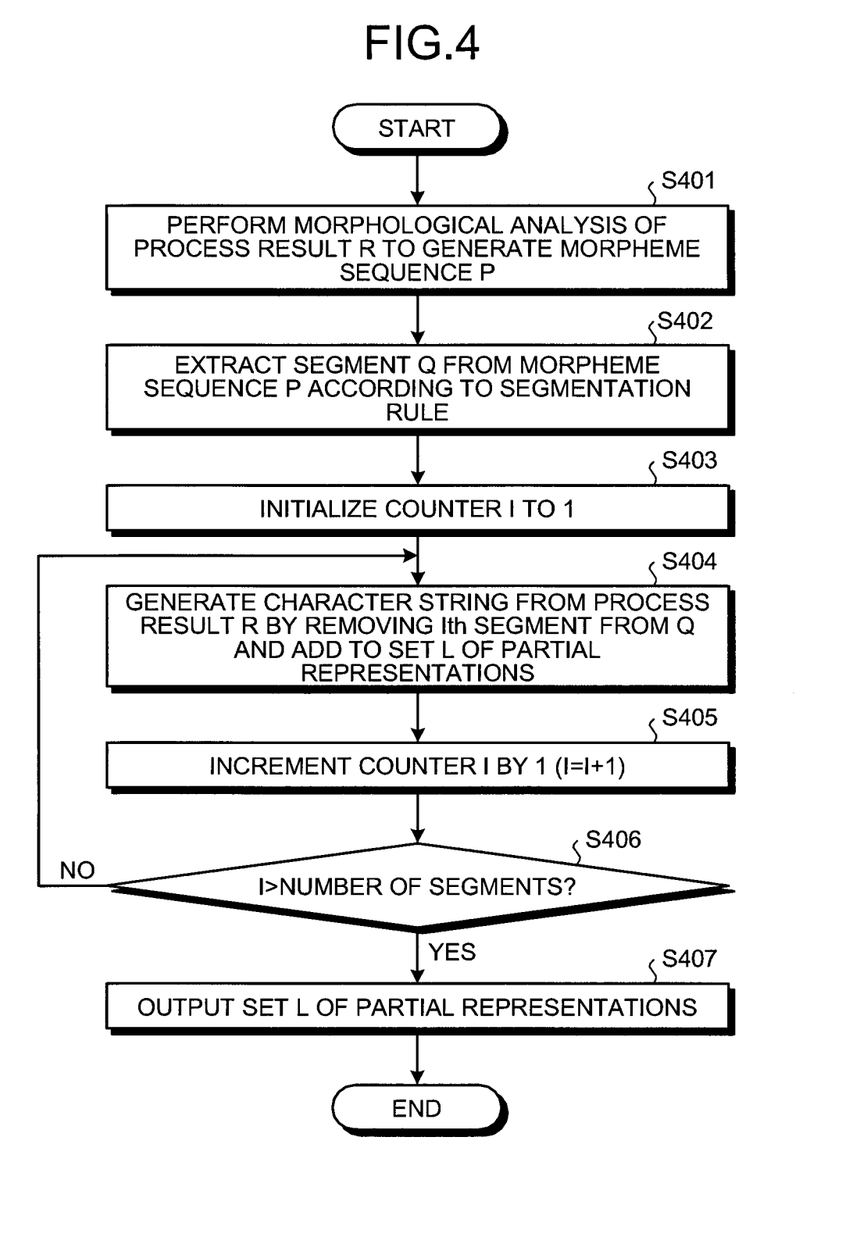
FIG. 4 is a flowchart of an entire partial representation generating process according to the first embodiment.
Figure 15:
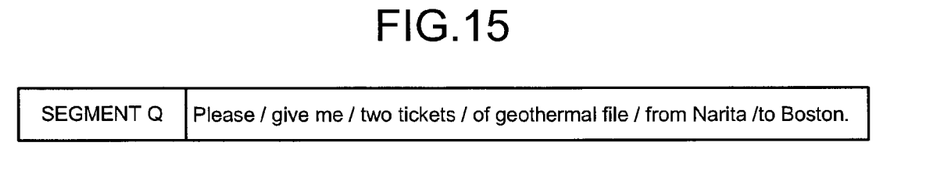
FIG. 15 is a schematic diagram for explaining an example of divided segments.

In the second embodiment, the partial representation generating process is performed, considering the translation result by the translating unit 1208 as the process result R in the partial representation generating process as shown in FIG. 4. FIG. 15 is a schematic diagram for explaining an example of segments Q that are divided by the segmenting process in the partial representation generating process.

Figure 16:
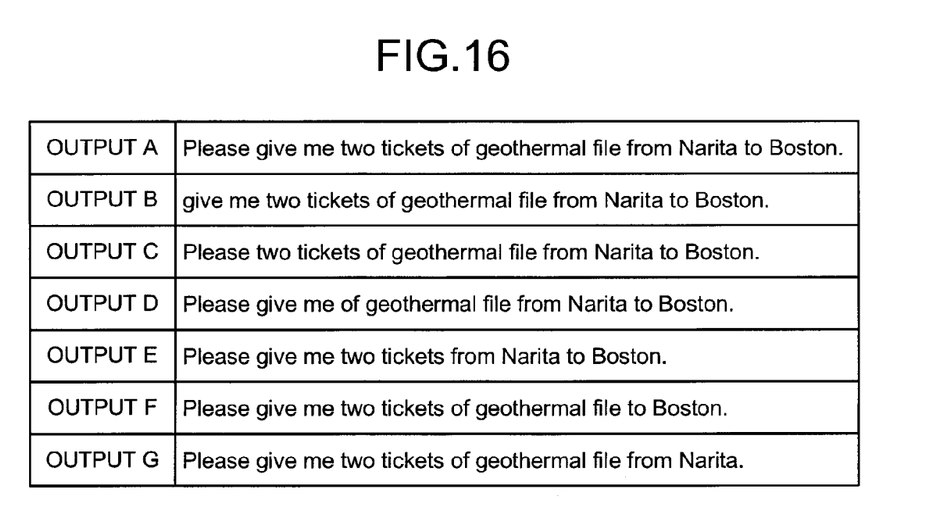
FIG. 16 is a schematic diagram for explaining an example of candidates for target to be processed.

When the divided segments Q are obtained, the generating unit 105 successively generates partial representations by removing the divided segments one by one, adds the generated partial representations in the set L of partial representations (step S404). FIG. 16 is a schematic diagram for explaining an example of candidates for the target to be processed, including the set L of partial representations generated based on the segments Q divided as shown in FIG. 15.

Figure 17:
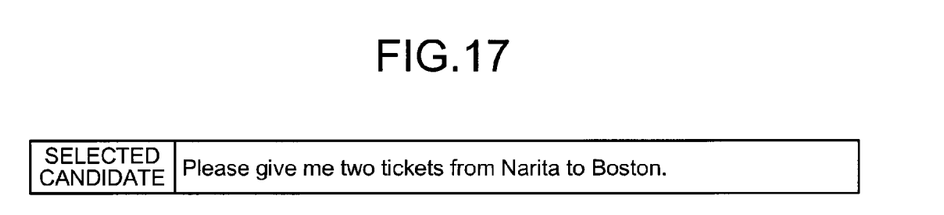
FIG. 17 is a schematic diagram for explaining an example of a selected candidate.

The candidates for the target to be processed as shown in FIG. 16 are presented to the user (step S1310), and selection of a candidate by the user is received (step S1311). FIG. 17 depicts a case that the user selects an output E that is a partial representation generated by removing a segment including a translation corresponding to the underlined Japanese in the recognition result 601 in FIG. 6.

The partial representations are generated and presented with regard to the speech recognition result in the first embodiment, while in the second embodiment, the processes such as generation of partial representations, presentation of candidates, and receiving of candidates are performed with regard to the translation result that is obtained by translating the speech recognition result. Accordingly, the user who can understand the target language can select an appropriate candidate from the presented candidates. Therefore, the communication support process can be continuously performed without a burdensome correction process.

The speech processing apparatus according to the second embodiment can generate partial representations for a translation result that is obtained by translating a recognition result, and present the generated partial representations. Therefore, the process of supporting cross-language communications can be promptly continued without a burdensome correction operation.

A hardware configuration of the speech processing apparatus according to the first or second embodiment is explained.

Figure 18:
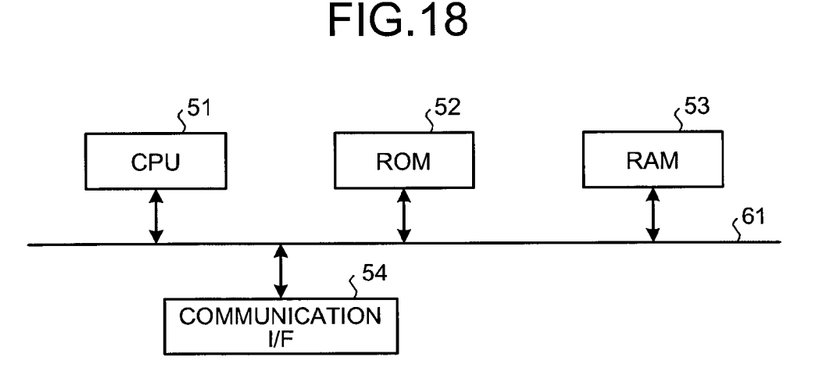
FIG. 18 is a schematic diagram for explaining a hardware configuration of the speech processing apparatus according to the first or second embodiment.

As shown in FIG. 18, the speech processing apparatus according to the first or second embodiment has a controller such as a central processing unit (CPU) 51, storage units such as a read only memory (ROM) 52 and a RAM 53, a communication interface (I/F) 54 that is connected to a network to establish communications, and a bus 61 that connects the respective components.

A speech processing program that is executed by the speech processing apparatus according to the first or second embodiment is previously installed in the ROM 52 or the like.

The speech processing program executed by the speech processing apparatus according to the first or second embodiment can be stored as a file of an installable format or an executable format in a computer-readable storage medium such as a compact disk read only memory (CD-ROM), a flexible disk (FD), a compact disk recordable (CD-R), and a digital versatile disk (DVD).

The speech processing program executed by the speech processing apparatus according to the first or second embodiment can be stored in a computer that is connected to a network such as the Internet, and downloaded through the network. The speech processing program executed by the speech processing apparatus according to the first or second embodiment can be provided or distributed through a network such as the Internet.

The speech processing program executed by the speech processing apparatus according to the first or second embodiment has a module configuration including the respective components above mentioned (the speech receiving unit, the recognizing unit, the determining unit, the analyzing unit, the generating unit, the candidate output unit, the selection receiving unit, the translating unit, and the language output unit). As the practical hardware, the CPU 51 reads the speech processing program from the ROM 52 and executes the program, so that the respective components are loaded on the main storage unit, to generate the respective components on the main storage unit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A speech processing apparatus comprising:
a speech receiving unit that receives input speech;
a speech processing unit that performs a speech recognizing process on the input speech to obtain a recognition candidate;
an analyzing unit that performs a morphological analysis of the recognition candidate;
a generating unit that:
divides, via a processor of the apparatus, the recognition candidate into a plurality of first segments each including at least one morpheme, and
generates a plurality of partial character string candidates, each consisting of a subset of the first segments, the subset being obtained by removing one or more of the first segments from the recognition candidate, the subset for each partial character string candidate being different from the other subsets;
a first output unit that outputs the partial character string candidates to a display unit; and
a selection receiving unit that receives a selection of a partial character string selected from the partial character string candidates.

2. The apparatus according to claim 1, wherein the speech receiving unit receives the input speech in a first language, and wherein the apparatus further comprises:
a translating unit that translates the received partial character string selection into a second language to obtain a translation result; and
a second output unit that outputs the translation result.

3. A speech processing apparatus comprising:
a speech receiving unit receives the input speech in a first language;
a speech processing unit performs a speech recognizing process on the received input speech to obtain a recognition candidate, and translates the recognition candidate into a second language to obtain a text character string;
an analyzing unit that performs a morphological analysis of the text character string;
a generating unit that:
divides, via a processor of the apparatus, the text character string into a plurality of segments each including at least one morpheme, and
generates a plurality of partial character string candidates, each consisting of a subset of the segments, the subset being obtained by removing one or more of the segments from the text character string, the subset for each partial character string candidate being different from the other subsets;
a first output unit that outputs the partial character string candidates to a display unit; and
a selection receiving unit that receives a selection of a partial character string selected from the partial character string candidates.

4. The apparatus according to claim 1, wherein the generating unit:
divides the recognition candidate into a plurality of second segments representing a syntactic structure unit of a sentence including a word, a segment and a phrase, and
generates the partial character string candidates so as to include at least one of the second segments.

5. The apparatus according to claim 1, wherein the generating unit:

divides the recognition candidate into a plurality of third segments representing a semantic unit of a phrase including at least one of a figure, a time, a degree, a greeting and a formulaic expression and generates the partial character string candidates obtained by removing at least one of the third segments from the recognition candidate.

6. The apparatus according to claim 1, further comprising:
a storage unit that can store the received partial character string and the recognition candidate as a generation source of the partial character string, in association with each other,
wherein the selection receiving unit stores in the storage unit the received partial character string and the recognition candidate as the generation source of the partial character string, in association with each other.

7. The apparatus according to claim 6, further comprising:
a determining unit that determines whether the partial character string corresponding to the recognition candidate is stored in the storage unit,
wherein the generating unit obtains the partial character string corresponding to the recognition candidate from the storage unit to generate the partial character string candidate, when the partial character string corresponding to the recognition candidate is stored in the storage unit.

8. The apparatus according to claim 6, further comprising:
a determining unit that determines whether the partial character string corresponding to the recognition candidate is stored in the storage unit,
wherein the first output unit prioritizes the output of the partial character string candidate stored in the storage unit over the partial character string candidates that are not stored in the storage unit.

9. The apparatus according to claim 1, wherein the speech processing unit further calculates likelihood indicating a probability of the recognition candidate of the received input speech, and the apparatus further comprises a determining unit that determines whether the likelihood is smaller than a predetermined threshold value, wherein the generating unit generates the partial character string candidates when the determining unit determines that the likelihood is smaller than the threshold value.

10. The apparatus according to claim 9, wherein the first output unit outputs the recognition candidate when the determining unit determines that the likelihood is larger than the threshold value.

11. The apparatus according to claim 1, wherein the first output unit extracts a predetermined number of the partial character string candidates from the partial character string candidates, and outputs the extracted partial character string candidates.

12. The apparatus according to claim 1, wherein:
the speech processing unit further calculates likelihood indicating a probability of the recognition candidate of the received input speech, and
the first output unit outputs a predetermined number of partial character string candidates among the partial character string candidates according to the likelihood of the recognition candidate.

13. A speech processing method comprising:
receiving an input speech;
performing a speech recognition process on the input speech to obtain a recognition candidate;
performing a morphological analysis of the recognition candidate;
dividing the recognition candidate into a plurality of segments each including at least one morpheme;
generating, via execution of a processor, a plurality of partial character string candidates, each consisting of a subset of the segments, the subset being obtained by removing one or more of the segments from the recognition candidate, the subset for each partial character string candidate being different from the other subsets;
outputting the partial character string candidates to a display unit; and
receiving a selection of a partial character string selected from the partial character string candidates.

14. A tangible non-transitory computer-readable medium including programmed instructions for processing an input speech, wherein the instructions, when executed by a computer, cause the computer to perform:
receiving an input speech;
performing a speech recognizing process on the input speech to obtain a recognition candidate;
performing a morphological analysis of the recognition candidate;
dividing the recognition candidate into a plurality of segments each including at least one morpheme;
generating, via execution of a processor, a plurality of partial character string candidates, each consisting of a subset of the segments, the subset being obtained by removing one or more of the segments from the recognition candidate, the subset for each partial character string candidate being different from the other subsets;
outputting the partial character string candidates to a display unit; and
receiving a partial character string selected from the partial character string candidates.

* * * * *